March 28, 1961 E. C. HAGAR 2,976,842
ANIMAL DUSTER
Filed Dec. 2, 1958
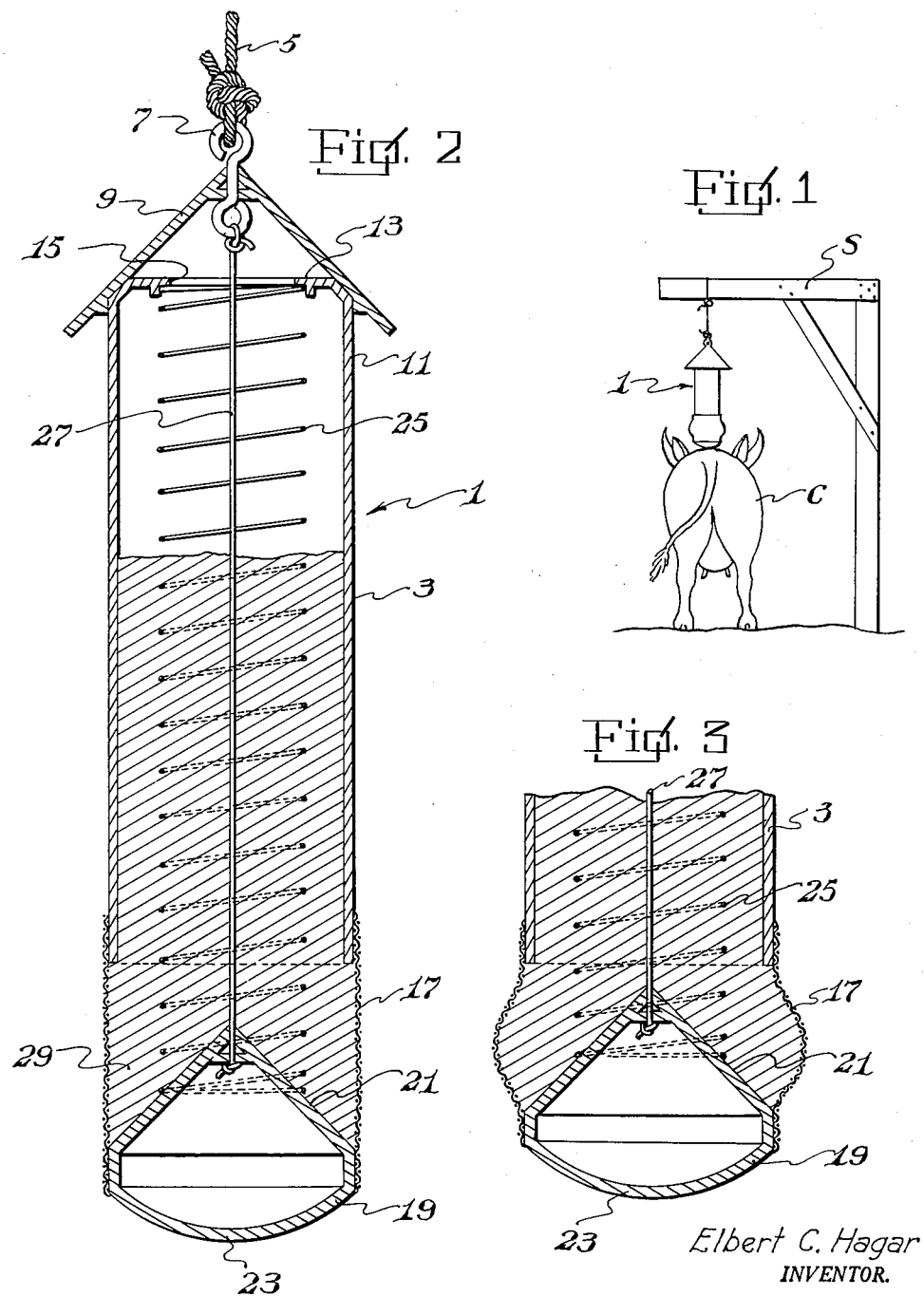
Elbert C. Hagar
INVENTOR.
BY Robert J. Patin
ATTY 2,976,842

ANIMAL DUSTER

Elbert C. Hagar, Tulsa, Okla. (Rte. 1, Claremore, Okla.)

Filed Dec. 2, 1958, Ser. No. 777,720

8 Claims. (Cl. 119—159)

The present invention relates to an animal duster, and more particularly to a dispenser for applying disinfectant powder to animals contacting the dispenser. The device of this invention has utility in connection with dusting all farm and range animals, particularly cattle, and in its smaller forms is suitable for use in dusting fowl.

It is an object of the present invention to provide an animal duster which will disperse disinfectant powder in the form of a cloud in the immediate vicinity of the duster.

Another object of the present invention is the provision of an animal duster which operates readily upon contact with animals.

Still another object of the present invention is the provision of an animal duster having no rigid parts which are in contact with each other for relative movement, so that the possibility of malfunction of the device is reduced to a minimum.

The invention also contemplates the provision of an animal duster which is easily refillable, but which at the same time is so inexpensive to manufacture that it may if desired be disposed of after only a single use.

Finally, it is an object of the present invention to provide an animal duster which is simple in structure, easy to manufacture, and rugged and durable in use.

Other objects and advantages of the present invention will become apparent from a consideration of the following description, taken in connection with the accompanying drawing, in which:

Figure 1 is a view showing the device of the present invention in use applying disinfectant powder to an animal;

Figure 2 is an enlarged cross-sectional view of the dispenser of the present invention; and Figure 3 is a fragmentary view of a portion of Figure 2 but showing the parts in dispensing relationship as when contacted by an animal.

Referring now to the drawing in greater detail, there is shown in Figure 1 an animal duster indicated generally at 1 which is suspended in pendant relationship from a support S at a height such that the lower end thereof may be contacted by cattle C to dispense a cloud of disinfectant powder in the immediate vicinity of the animal contacting the device thereby to dust the animal with disinfectant powder.

As seen better in Figure 2, duster 1 comprises an elongated container 3 adapted to be suspended from its upper end by a cord 5 which in turn will be tied to or otherwise supported from any convenient support such as the door to a hen house or a barn, or a low limb of a shade tree, or the like. Cord 5 at its lower end is secured to an eye 7 which is fixed in the upwardly extending apex of a conical hood 9 and extends therethrough. Hood 9 fits over the upper end of a rigid tubular body portion 11 of container 3, which in the illustrated embodiment is generally cylindrical. Body portion 11 terminates upwardly in an annular in-turned flange 13 having a centrally located large filling opening 15 for filling and refilling container 3 with disinfectant powder as the need arises.

Cemented to the outer lower end of tubular body portion 11 is a flexible porous sleeve 17 which encompasses the lower end of container 3 and may, for example, be of a loosely woven fabric such as burlap, glass fiber, or the like. An ejector member 19 of relatively rigid material such as hard rubber or plastic is cemented within the lower end of flexible sleeve 17 and has an inverted conical upper portion 21 the apex of which extends upwardly, and a rounded lower portion 23 adapted to be contacted by animals and rounded so as to prevent damage to the animals.

Disposed and acting between in-turned flange 13 and conical upper portion 21 is a coil compression spring 25 which tends to force apart body portion 11 and ejector member 19 thereby to maintain flexible sleeve 17 extended. In order to remove some of the tension which would otherwise be imposed on flexible sleeve 17, and also to maintain hood 9 fully seated on tubular body portion 11, a cord 27 extends between and interconnects in tension the lower end of eye 7 and the upper end of conical upper portion 21.

The container is thus characterized by a pair of relatively rigid wall portions comprising the outer portions of the tubular body portion 11 and ejector member 19, interconnected in spaced relationship by a relatively flexible sleeve of porous material comprising flexible sleeve 17.

The operation of the device will now be clear. From the position of parts shown in Figure 2, hood 9 and tubular body portion 11 are forced apart against the action of spring 25 and a quantity of disinfectant powder 29 is introduced through opening 15 into container 3 in which it is confined by the walls defined by body portion 11, sleeve 17 and ejector member 19. The force which is used to separate hood 9 and body portion 11 is released, whereupon the force of spring 25 acting through ejector member 19 and cord 27 pulls hood 9 down on container 3 adjacent in-turned flange 13, mating interengaging surfaces being provided on hood 9 and the upper end of tubular body portion 11 for this interfitting engagement. The device is now ready to hang from its upper end in the pendant relationship shown for example in Figure 1. In this position, the parts have the disposition shown in Figure 2, the flexible sleeve 17 being extended as shown. It should also be noted that the hood 9 extends outwardly beyond the remainder of the container 3 so as to protect the container from rain and keep the disinfectant powder dry. Upon contact between an animal and rounded lower portion 23, ejector member 19 is forced upwardly to the position shown in Figure 3. It must be noted that conical upper portion 21 of ejector member 19 even in the rest position shown in Figure 2 extends upwardly a substantial distance above the lower end of flexible sleeve 17, so that the inclined faces of conical upper portion 21 are on a level with a substantial portion of flexible sleeve 17. The effect of this arrangement is that when ejector member 19 is forced upwardly by contact with an animal, the lowermost portion of powder 29 will be forced outwardly as well as somewhat upwardly, thereby assuring that flexible sleeve 17 will bow out into the configuration indicated in Figure 3 and that a small quantity of powder 29 will be forced through porous sleeve 17 to disperse in the air as a cloud of powder in the immediate vicinity of the lower end of the duster, thereby to apply at least a portion of this powder to the animal which actuated the duster. When the animal moves away, ejector member 19 will return to its lowermost position under the action of spring 25 and the quantity of disinfectant powder 29 will fall to its new, somewhat lower level in container 3 preparatory to another use thereof.

From a consideration of the foregoing, it will be obvious that all the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. An animal duster comprising a container having a pair of relatively rigid wall portions interconnected in spaced relationship by a relatively flexible sleeve of porous material, and compression spring means acting between the pair of relatively rigid wall portions for normally maintaining said sleeve extended.

2. An animal duster comprising an elongated relatively rigid sleeve, means for suspending the sleeve from its upper end, a flexible sleeve of porous material at the lower end of the relatively rigid sleeve, and a relatively rigid ejector member at the lower end of and closing the flexible sleeve.

3. An animal duster as claimed in claim 2, the ejector member having an upper surface in the form of an inverted cone.

4. An animal duster as claimed in claim 3, and compression spring means acting between the conical upper surface of the ejector member and the upper end of the relatively rigid sleeve for normally maintaining the flexible sleeve extended.

5. An animal duster as claimed in claim 2, and compression spring means acting between the ejector member and the upper end of the relatively rigid sleeve for maintaining the flexible sleeve extended.

6. An animal duster comprising an elongated container, means for suspending the container from its upper end, the container at its lower end comprising a flexible sleeve of porous material and an ejector member spaced from the remainder of the container by the sleeve and having centrally upwardly converging upper surfaces.

7. An animal duster as claimed in claim 6, and compression spring means acting between said upper surfaces of the ejector member and the upper end of the container for normally maintaining the sleeve extended.

8. An animal duster comprising an elongated container, means for suspending the container from its upper end, the container at its lower end comprising a flexible sleeve of porous material and an ejector member spaced from the remainder of the container by the sleeve, and compression spring means acting between the ejector member and the upper end of the container for normally maintaining the sleeve extended.

References Cited in the file of this patent

UNITED STATES PATENTS

| | | |
|---|---|---|
| 546,533 | Hetherington | Sept. 17, 1895 |
| 1,167,561 | Hudson | Jan. 11, 1916 |